July 15, 1958
A. M. YOUNG
2,843,720
HEATING AND CONTROL ARRANGEMENT FOR ELECTRICALLY
HEATED COOKING RECEPTACLE
Filed April 22, 1954
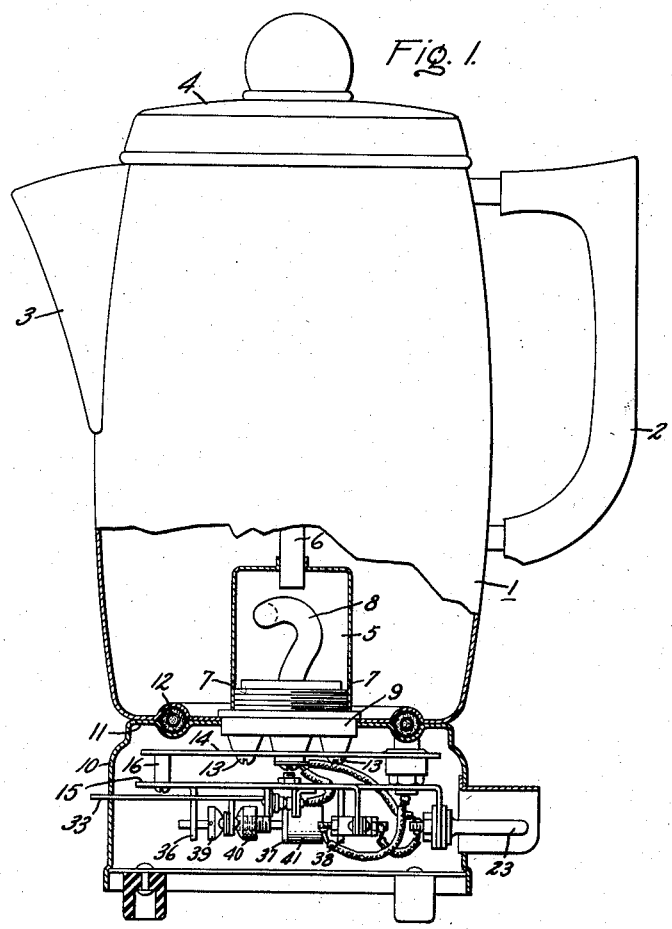
Inventor:
Allan M. Young,
by Frank L. Neuhauser
His Attorney.

United States Patent Office 2,843,720
Patented July 15, 1958

2,843,720

HEATING AND CONTROL ARRANGEMENT FOR ELECTRICALLY HEATED COOKING RECEPTACLE

Allan M. Young, Meriden, Conn., assignor to General Electric Company, a corporation of New York Application April 22, 1954, Serial No. 424,954

8 Claims. (Cl. 219—44)

The present invention relates to electrically heated cooking receptacles wherein it is desired to effect quickly and to time a cooking operation therein. The invention is well adapted for use in electric coffee percolators and it is this application of my invention which I have elected specifically to illustrate and describe. It is to be understood, however, that the invention as to certain aspects is not limited to coffee percolators but may be used wherever found applicable.

One object of the invention is to provide in connection with electric heating means for a receptacle improved control means responsive to receptacle temperature which can be adjusted to vary the cooking or heating time.

Another object of the invention is to provide improved control means for a receptacle having a plurality of heating units.

Other objects and advantages of the invention are pointed out hereinafter, and for a consideration of what I believe to be novel and my invention attention is directed to the following specification and to the claims appended thereto.

According to one feature of the invention there is provided for an electrically heated cooking receptacle suitable heating means and in connection therewith a switch in the heating unit circuit having an actuator which is moved positively by a bimetallic thermostat to effect opening and closing of the switch, the thermostat being adjustable with respect to the actuator to vary the temperature at which the thermostat actuates the switch, and magnetic means being provided in connection with the actuator for holding the switch in both closed and open positions whereby a wide range in temperature may be provided between the opening and the closing temperatures.

According to another feature of the invention, a feature especially applicable to coffee percolators there are provided for the coffee percolator a pumping heating unit which is utilized to effect circulation of water through the fountain tube, an auxiliary heating unit which is in circuit during an initial part of the coffee making period to assist in bringing the water up to percolating temperature, and a keep-warm heating unit which functions to keep the brew hot after it has been made. During the initial coffee making period both the pumping heating unit and the auxiliary heating unit are in circuit. After the water has reached a predetermined temperature a thermostat opens the auxiliary heating unit circuit and places the keep-warm heating unit in circuit. The pumping heating unit circuit is then maintained closed until the coffee is brewed after which a second thermostat opens this circuit leaving only the keep-warm heating unit in circuit, the second thermostat being arranged whereby it may be adjusted to control the strength of the brew after the manner pointed out in the preceding paragraph.

In the drawing, Fig. 1 is a side elevation, partly in section, of a coffee maker embodying the invention. Fig. 2 is a plan view of the base showing control mechanism mounted thereon. Fig. 3 is a wiring diagram.

Referring to the drawing, 1 indicates the brew holding receptacle, 2 the handle, 3 the pouring spout and 4 the cover of a coffee pot of the percolator type. In the coffee pot is an inverted cup which forms a percolator well 5 to the upper end wall of which is attached the fountain tube 6. In the side wall of well 5 are openings 7 for flow of water from the area surrounding the well to the interior of the well. When water in the well is heated steam is formed which forces water up through tube 6 to the coffee basket (not shown) at the upper end of the tube and from which the water drips back through the ground coffee in the basket and openings in the basket to the vessel.

The structure so far described is a known type of percolator for brewing coffee and is to be taken as typical of any suitable structure.

The present invention has to do with the structure and arrangement of the heating units for the percolator and the control for such units.

In well 5 is a pumping heating unit 8 carried by a base 9 mounted in an opening in the bottom wall of vessel 1. Vessel 1 is mounted on a base 10 the top wall 11 of which is attached to the bottom wall of the vessel by suitable means (not shown) and between top wall 11 and the bottom wall of vessel 1 is a heating unit 12 which forms the auxiliary heating unit and the keep-warm heating unit. It is spaced from well 5 so that while it is effective for heating water in the receptacle it has but minor effect in the direct heating of water in the well.

Attached to base 9 by screws 13 is a frame comprising two spaced parallel plates, an upper plate 14 which is directly attached to base 9 by the screws 13 and a lower plate 15 which is attached to plate 14 by fasteners 16. Carried by the frame and suitable insulated therefrom are, as indicated in Fig. 3, two terminals 17 for heating unit 8 and three terminals 18, 19 and 20 for heating unit 12. In the present instance the auxiliary heating unit and the keep-warm heating unit are provided by dividing unit 12 into two sections 21 and 22. Section 21 forms the auxiliary heating unit and sections 21 and 22 when connected in series form the keep-warm heating unit. On plate 15 is an ear on which are attached the two circuit terminals 23 and 24 to which the heater plug of a cord set may be connected.

Terminal 23 is connected by a conductor 25 to a contact 26 carried by a spring switch blade 27 mounted on the underside of plate 15. Switch blade 27 is biased in a direction to hold contact 26 in engagement with a contact 28 carried by a spring switch blade 29 which is biased against a stop ear 29a on plate 15. Contact 28 is connected by a conductor 30 to one terminal 17 of heating unit 8. The other terminal 17 is connected by a conductor 31 to terminal 24. Switch blade 27 is actuated to move contact 26 from engagement with contact 28 by a thermostat 32 here shown as being of the bimetal type, fixed at one end to a lever 33 pivoted on plate 15 as indicated at 34. The free end of lever 33 projects out through a slot in the side wall of base 10 where it is accessible for turning the lever. The free end of thermostat 32 is bifurcated, the furcations extending on opposite sides of a rod 35 which forms an actuator for switch blade 27. Rod 35 is mounted to slide in openings in spaced apart ears 36, 37 and 38 on plate 15. On rod 35 on opposite sides of the bifurcated end of thermostat 32 is a fixed abutment 39 and an adjustable abutment 40, the latter being in the form of a nut threaded on a threaded section of rod 35. One end of rod 35 is adjacent to the outer end of switch blade 27. On rod 35 between ears 37 and 38 is fixed a small permanent magnet 41. Magnet 41 is of a length less than the distance between ears 37 and 38. The ears form stops with which the magnet engages to limit the movements of rod 35. When unheated, thermostat 32 stands in the position shown in Figs. 2 and 3, it being against abutment 39. It holds the end of rod 35 out of contact with blade 27, permitting the blade due to its bias to hold contact 26 in engagement with contact 28. Permanent magnet 41 is in engagement with ear 37 and is held in such engagement due to its magnetism. When thermostat 32 is heated it flexes toward abutment 40 and when a predetermined temperature is reached it engages the abutment and eventually presses on it sufficiently to overcome the action of magnet 41 whereupon rod 35 moves quickly into engagement with blade 27 to separate contacts 26 and 28 with a snap action. At the same time magnet 41 is brought into engagement with ear 38 and will be held magnetically by the ear. When the thermostat cools down again it engages abutment 39 and effects closing of the contacts with a snap action in a similar manner, it being necessary for the thermostat to cool down enough to build up pressure on abutment 39, sufficient to overcome the magnetic action between magnet 41 and ear 38. Thus the magnet 41 in addition to effecting opening and closing of contacts 26, 28 with a snap action serves also to provide means whereby a relatively high temperature is required before the contacts will be opened and a relatively low temperature will be required before the contacts will be again closed. By this means, after percolation is completed the brew may be permitted to cool down to a suitable serving temperature and maintained at such temperature without contacts 26, 28 being again brought into engagement to start percolation.

Terminal 23 is connected by a conductor 45 to terminal 18 of heating unit 21. The other terminal 20 of heating unit 21 is connected to circuit terminal 24 by a conductor 46 in which is located the terminals of a thermostat 47, shown as a bimetal. The terminal 19 of heating unit 22 is connected to circuit terminal 24 by a conductor 48.

In use the needed amount of ground coffee is placed in the coffee basket and the needed amount of water is placed in the vessel. Terminals 23 and 24 are then connected by a cord set to the electric circuit. This closes the heating circuit on pumping heating unit 8 by way of contacts 26 and 28 and the heating circuit on auxiliary heater 21 by way of conductors 45 and 46 and the contacts of thermostat 47. The two heating units acting together serve to bring the water quickly to a temperature at which percolation will start. This will be a temperature below boiling temperature for the water in the vessel. Only water in the well 5 will be vaporized to effect the pumping action. When the temperature of the water in vessel 1 reaches a predetermined high value, for example a temperature of the order of 160° F., thermostat 47 will open thus opening the auxiliary heating unit circuit and at the same time putting in circuit the keep-warm heating unit comprising windings 21 and 22 by connecting them in series directly across terminals 23 and 24 by way of conductors 45 and 48. The circuit through heating unit 8 serves to maintain pumping of water until at a higher temperature thermostat 32 effects the opening of contacts 26, 28 as already explained. This may be a temperature of the order of 195° F. for example. This leaves in circuit now the keep-warm unit and it will maintain the brew at a desired serving temperature, for example a temperature of the order of 170° F., this being a temperature above that at which bimetallic thermostat 47 closes and a temperature above that at which contacts 26, 28 will be reclosed.

The bimetallic thermostats 32 and 47 are so located with respect to vessel 1 that they respond to the temperature of the brew in the receptacle.

The temperature at which thermostat 32 will separate contacts 26, 28 and hence the length of time during which percolation will take place can be adjusted by moving lever 33. As viewed in Fig. 2, moving lever 33 counterclockwise will bring the free end of thermostat 32 closer to abutment 40 which means that the thermostat will effect opening of contacts 26, 28 at a lower temperature. Hence this serves to shorten the brew period. The side wall of base 10 may have thereon suitable indicia to indicate the correct setting of lever 33 to give the desired strength of brew.

The several heating units may have values to give the desired heating. For example, for one size percolator I have found it satisfactory to use a 400 watt pumping heating unit, a 250 watt auxiliary heating unit and an 85 watt keep-warm heating unit.

When the percolator is disconnected from the electric circuit, it then cools down and at a lower temperature the contacts of bimetallic thermostat 47 will again close and bimetallic thermostat 32 will build up pressure on abutment 39 sufficient to move magnet 41 away from engagement with ear 38 and into engagement with ear 37. The percolator is then in condition to repeat the coffee brewing cycle.

By the invention there is provided simple reliable mechanism useful especially in a coffee maker of the percolator type which is readily adjustable for varying the percolating time, which after the brew is made will keep it hot, and which by reason of the auxiliary heating unit shortens the heating up period prior to the start of percolation and hence shortens the time required to make a brew.

What I claim as new and desire to secure by Letters Patent of the United States is:

1. In an electric heating device, a receptacle, an electric heating unit for the receptacle, an electric circuit for the heating unit, a switch in the electric circuit, an actuator movable between two positions for opening and closing the switch, spaced abutments on the actuator, a bimetallic thermostat mounted on the receptacle responsive to the temperature thereof having an end positioned between said abutments for moving the actuator, means for adjusting the end of the thermostat with respect to the abutments, and magnetic means for holding the actuator in either of its two positions.

2. In an electric heating device, a receptacle, an electric heating unit for the receptacle, an electric circuit for the heating unit, a switch in the electric circuit, a pair of spaced ears mounted adjacent to the switch, a switch actuating rod which slides in openings in said ears for opening and closing the switch, spaced abutments on said rod, a bimetallic thermostat mounted on the receptacle responsive to the temperature thereof having an end positioned between said abutments for moving said rod, means for adjusting the end of the thermostat with respect to the abutments, and a magnet carried by said rod between said ears and cooperating with the ears for holding said rod in its switch closed and switch open positions.

3. In an electrically heated percolator, a receptacle, a well in the receptacle, a base on which the receptacle is mounted, a heating unit for the well, an electric circuit for the heating unit, a switch in the circuit mounted on the base comprising a movable switch blade, an actuator mounted on the base and movable between two positions for moving said switch blade to open and close said switch, a pair of spaced abutments on the actuator, a bimetallic thermostat mounted on the base having an end positioned between said abutments, and means for adjusting the thermostat end with respect to said abutments for varying the temperatures at which the thermostat moves the actuator to effect opening and closing of said switch.

4. The combination defined by claim 3 wherein there is provided in connection with the actuator magnetic means for holding it in either of its two positions for fixing the temperatures at which the thermostat moves the actuator.

5. In an electrically heated coffee percolator, a receptacle, a well in the receptacle, a base on which the receptacle is mounted, a heating unit for the well, an electric circuit for the heating unit, a switch in the circuit mounted on the base comprising a movable switch blade, a pair of spaced ears on the base, an actuating rod for said switch blade mounted to slide in said ears for moving the switch blade to open and close the switch, a pair of spaced abutments on the rod, a bimetallic thermostat mounted on the base having an end positioned between said abutments for moving the rod, means for adjusting the end of said thermostat with respect to said abutments, and a magnet on said rod which cooperates with said ears for holding the rod in its circuit closing and circuit opening positions.

6. In an electrically heated coffee percolator, a receptacle, a well in the receptacle, a base on which the receptacle is mounted, a percolator heating unit for the well, an auxiliary heating unit for the receptacle, an electric circuit for the percolator heating unit, an electric circuit for the auxiliary heating unit, a switch in the percolator unit circuit mounted on the base having a movable switch blade, an actuator mounted on the base and movable between two positions for moving said switch blade to open and close said switch, a pair of spaced abutments on the actuator, a bimetallic thermostat mounted on the base having an end positioned between said abutments, means for adjusting the thermostat end with respect to said abutments for varying the temperatures at which the thermostat moves the actuator to effect opening and closing of said switch, and a thermostat mounted on the base for opening the auxiliary heating unit circuit at a predetermined high temperature for discontinuing the heating of the receptacle by the auxiliary heating unit after the water in the receptacle has reached a predetermined temperature.

7. In an electric coffee percolator, a receptacle, a percolator heating unit and a keep-warm heating unit for the receptacle, an electric circuit for each heating unit, a switch in the percolator heating unit circuit, an actuator for said switch, a thermostat mounted on the receptacle responsive to the temperature thereof for moving said actuator to open said switch when the temperature of the brew reaches a predetermined high value, and magnetic means for holding the actuator in circuit opening position until the thermostat cools down to a temperature lower than that at which said keep-warm heating unit maintains the brew.

8. In an electric coffee percolator, a receptacle, a percolator heating unit, an auxiliary heating unit and a keep-warm heating unit for the receptacle, an electric circuit for each heating unit, a switch in the percolator heating unit circuit, an actuator for said switch, a thermostat mounted on the receptacle responsive to receptacle temperature for moving said actuator to open said switch when the temperature of the brew reaches a predetermined high value, switch means responsive to receptacle temperature for opening the auxiliary heating unit circuit and closing the keep-warm heating unit circuit when the temperature reaches a value lower than that at which said actuator opens the switch in the percolator heating unit circuit, and magnetic means for holding the actuator in circuit opening position until said thermostat cools down to a temperature lower than that at which the keep-warm heating unit maintains the brew.

References Cited in the file of this patent

UNITED STATES PATENTS

| | | |
|---|---|---|
| 2,076,096 | Samuels et al. | Apr. 6, 1937 |
| 2,175,727 | Graham | Oct. 10, 1939 |
| 2,212,100 | Keaton | Aug. 20, 1940 |
| 2,489,854 | Brockman | Nov. 29, 1949 |
| 2,515,385 | Wales | July 18, 1950 |
| 2,576,432 | Wilcox | Nov. 27, 1951 |
| 2,610,283 | Kolisch | Sept. 9, 1952 |
| 2,657,300 | Sullivan | Oct. 27, 1953 |
| 2,694,770 | Sullivan | Nov. 16, 1954 |
| 2,798,143 | O'Brien | July 2, 1957 |